United States Patent [19]

Hinkle et al.

[11] Patent Number: 4,787,827
[45] Date of Patent: Nov. 29, 1988

[54] PORTABLE LUBRICATING APPARATUS

[75] Inventors: Charles G. Hinkle; Eugene W. Ware, Jr., both of Greer, S.C.

[73] Assignee: General Enterprises, Inc., Greer, S.C.

[21] Appl. No.: 34,644

[22] Filed: Apr. 6, 1987

[51] Int. Cl.<sup>4</sup> ............................................... B67D 5/52
[52] U.S. Cl. ...................................... 417/234; 184/36; 184/45.1; 184/105.1
[58] Field of Search .................... 417/234; 184/26, 36, 184/46, 45.1, 105.1; 222/83.5

[56] References Cited

U.S. PATENT DOCUMENTS

| 2,722,210 | 11/1955 | Koonce | 184/105.1 |
| 3,972,287 | 8/1976 | Braun | 184/105.1 |
| 4,109,831 | 8/1978 | Culpepper et al. | 222/386.5 |

Primary Examiner—Leonard E. Smith
Attorney, Agent, or Firm—Bailey & Hardaway

[57] ABSTRACT

A portable lubricating apparatus is illustrated which utilizes an upright removable and replaceable container of grease for delivery through a hose and nozzle carried on a wheeled chassis wherein a frame is carried adjacent one end of the wheeled chassis receiving the container of grease in such a way that a connection with the dispensing mechanism is effected by the act of replacing and installing a new container of grease.

4 Claims, 3 Drawing Sheets

PORTABLE LUBRICATING APPARATUS

BACKGROUND OF THE INVENTION

This is an improvement upon portable self-contained lubricating apparatus of the type illustrated in U.S. Pat. No. 4,109,831 wherein a grease container is provided with a source for filling a permanently installed container with lubricant. Such apparatus had the disadvantage, when lubricating a variety of apparatus having varying requirements as to lubricant characteristics, of requiring several lubricating apparatuses or engaging in an extensive grease replacement operation should it become necessary to change the type grease needed to accommodate a variety of end uses.

Accordingly, it is am important object of this invention to provide apparatus for readily changing grease containers wherein a new container of grease or lubricant is connected for delivery to the dispensing means automatically upon installation within a frame carried by a wheeled chassis.

Another important object of the invention contemplates a provision of connecting means for a replacement container of grease with a dispensing pump utilizing a quick connect coupling or in the alternative an upright tube having a cutting edge for fracturing the container upon installation of the container.

Still another important object of the invention involves the particular arrangement of components upon the elongated wheeled chassis wherein the replaceable upright lubricant container may be carried at one end of a wheeled chassis in an upright frame directly above a pump so that auxilliary components may be positioned in adjacent positions on the chassis.

SUMMARY OF THE INVENTION

It has been found that a portable lubricating apparatus utilizing an upright removable and replaceable container of grease for dispensing through a hose and nozzle may be provided by utilizing an upright frame carried at one end of a wheeled chassis for receiving a container of grease with automatically connectable coupling means carried within the upright frame for connecting the replaceable container of grease with the power operated dispensing mechanism including a pump positioned directly beneath the container.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
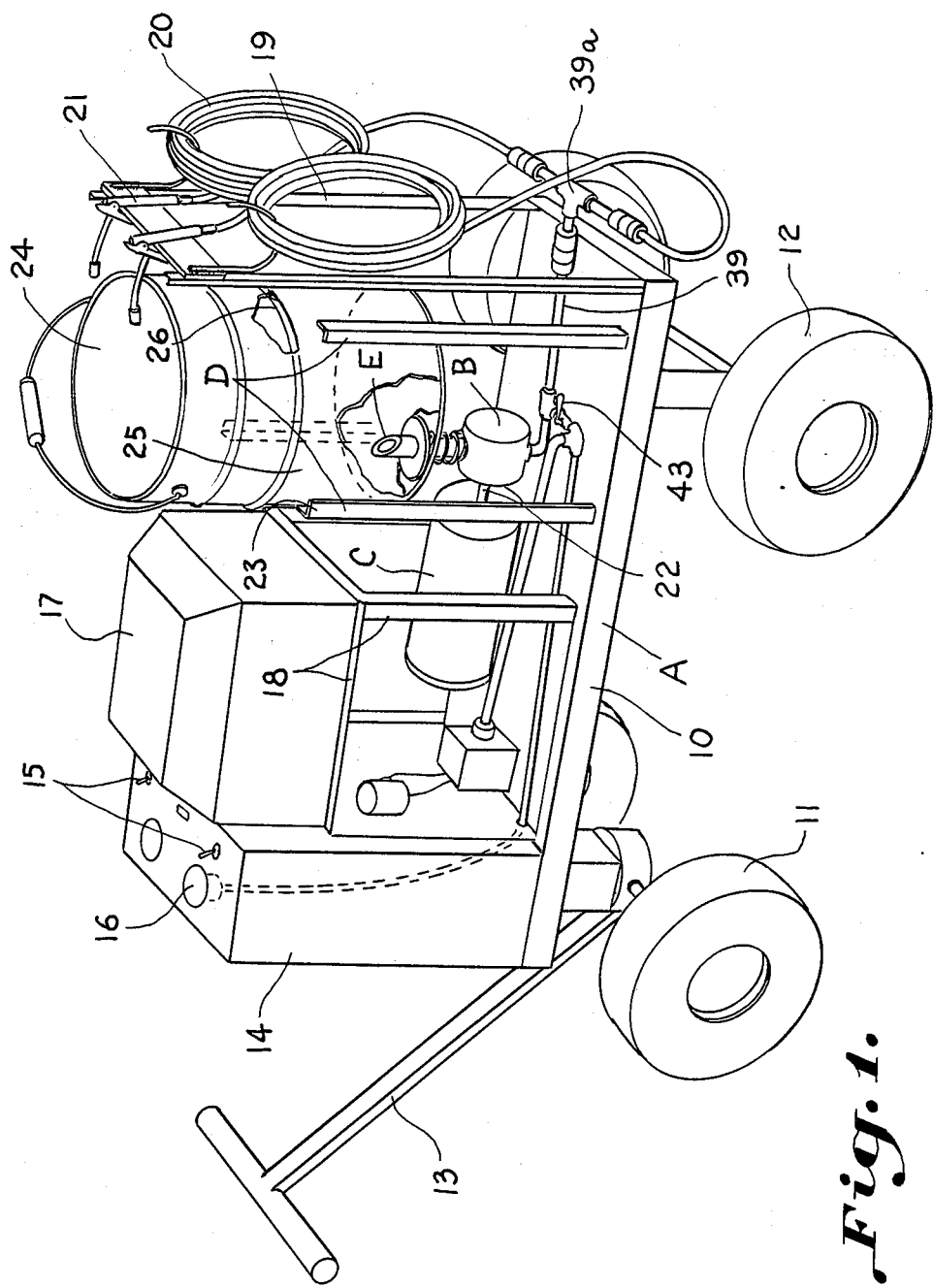
FIG. 1 is a perspective view illustrating a portable lubricating apparatus having a vertical frame adjacent one end of a wheeled chassis with an upright cutting means for fracturing the lower portion of a container of grease making automatic connection between the container and dispensing mechanism.

The drawings illustrate a portable lubricating apparatus utilizing an upright removable and replaceable container of grease for delivery through a hose and nozzle having an elongated horizontal wheeled chassis A. A pump B is carried adjacent one end of the chassis. An electric motor C and a battery therefor are carried in a portion of the chassis opposite the pump. A vertical frame D is carried by the chassis about the pump and extending thereabove for receiving an upright removable and replaceable container of grease. An upwardly projecting coupling means E is carried by the pump for communicating with a lower end of the container of grease receiving grease automatically upon reception of the container in the vertical frame supplying grease to the hose under pressure. Thus, the vertical frame guides the removable and replaceable container of grease to position for delivering grease to the pump through the coupling to serve as a temporary grease supply and to position same preparatory to removal for replacement by another removable and replaceable container of grease.

The coupling means E carried by the pump may be a receiving portion of a quick disconnect coupling, and including a delivery portion of the quick disconnect coupling carried by the lower portion of said container of grease for delivering grease to the pump. The coupling means E carried may also include an upright tube having an upturned cutting edge for fracturing the lower portion of the container of grease and penetrating same for receiving grease for delivery to the pump.

The elongated wheeled chassis A has a horizontal platform 10 with front wheels 11 and rear wheels 12. A towing handle 13 is illustrated for turning the front wheels 11 for maneuvering and pulling the portable lubricating apparatus. On a front end of the chassis illustrated in FIG. 1 a housing 14 is illustrated having an instrument panel including switches 15 and a pressure indicator 16. A battery 17 is carried in an intermediate portion of the chassis and is mounted on a suitable frame 18. An upright rectangular frame member 19 is carried at the rear of the platform 10 for carrying dispensing hoses 20 and nozzles 21.

The pump B is carried adjacent one end of the platform 10 toward the rear, and an electric motor C has connection with the pump through a power take-off shaft 22. The frame D includes a number of spaced upright angle members 23 for receiving a bucket 24 containing lubricant 25 beneath a piston 26 compressing the lubricant so that it will pass to the pump B for dispensing through the dispensing mechanism.

Figure 3:
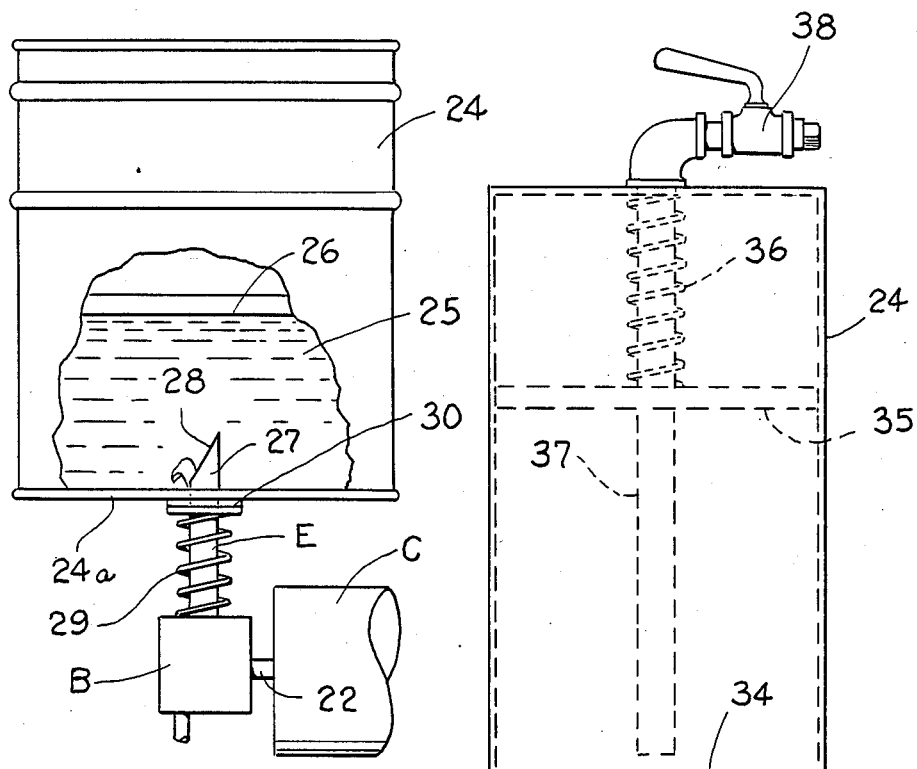
FIG. 3 is a side elevation illustrating the container and automatic connecting mechanism having the vertical cutting surface illustrated in FIG. 1 at an enlarged scale.

Referring to FIGS. 1 and 3, it will be observed that the upright pipe 27 has an angular cutting face 28 extending upwardly for penetrating a bottom 24a of the container 24. A spring 29 has a presser member 30 for urging the container upwardly and for supporting same when the container 24 is positioned within the frame D.

Figure 2:
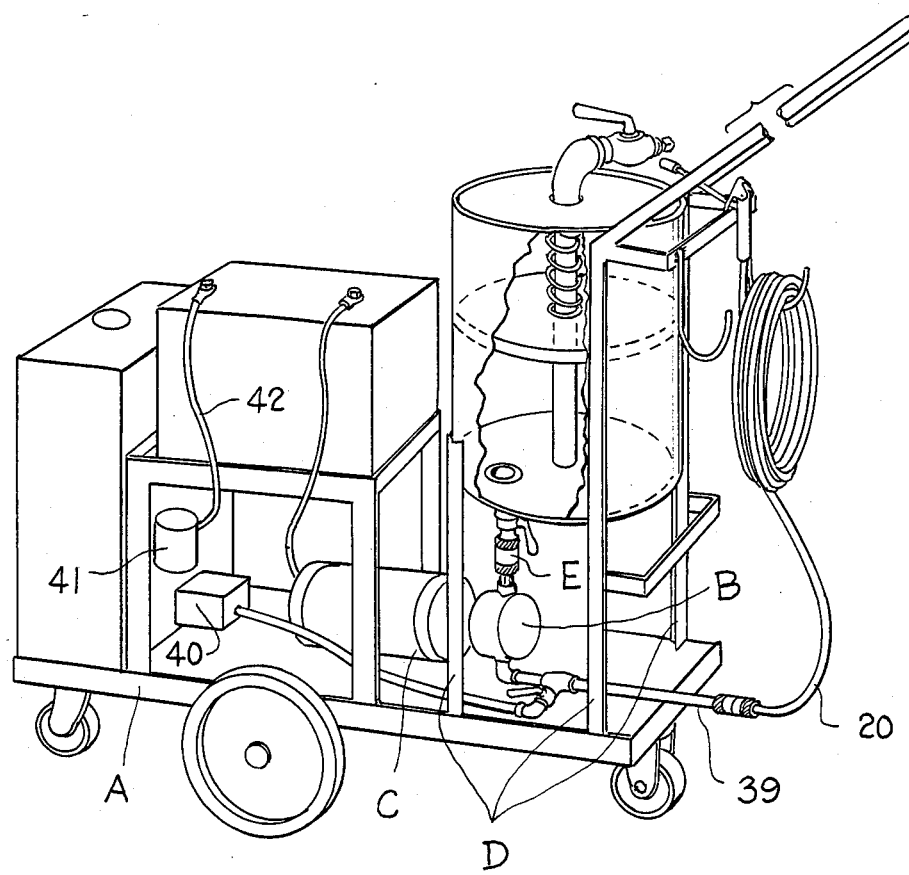
FIG. 2 is a perspective view illustrating a modified form of the invention of FIG. 1 employing a conventional quick disconnect means for automatically connecting a container of lubricant with the dispensing mechanism.
Figure 4:
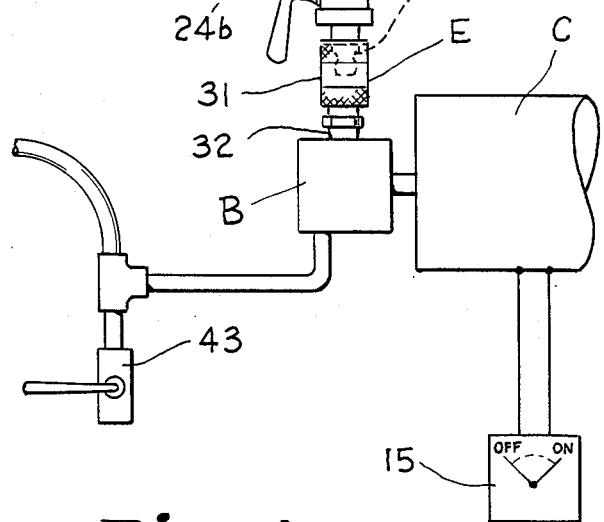
FIG. 4 is a side elevation at an enlarged scale illustrating the quick disconnect mechanism of FIG. 2.

Referring now to FIGS. 2 and 4, a modified form of the invention is illustrated wherein the upwardly projecting coupling means E is provided in the form of a quick disconnect coupling having the female coupling member 31 connected to the pump as by a threaded connection 32. The coupling member 31 projects upwardly to receive the nipple 33 which is carried by a valve 34 connected to the bottom 24b of the grease container 24 which is illustrated as being of a type having a piston 35 with spring 36 surrounding a lubricant injecting pipe 37. A valve 38 is provided for introducing the lubricant beneath the piston 34.

The pump B is illustrated as having a line 39 connected to the hose 20. A T-fitting is illustrated in FIG. 1 at 39a for connecting the line 39 to the hose 20. A pressure source is illustrated at 40 which actuates pressure sensing means 41 which is connected through the line 42 to gage 16. Suitable on-off switches are illustrated at 15, and a valve 43 is provided for purging the pump and associated lines when changing the grease supply provided by the removable changeable container 24.

While a preferred embodiment of the invention has been described using specific terms, such description is for illustrative purposes only, and it is to be understood that changes and variations may be made without departing from the spirit or scope of the following claims.

What is claimed is:

1. A portable lubricating apparatus utilizing an upright removable and replaceable container of grease for delivery through a hose and nozzle comprising:
    an elongated horizontal wheeled chassis;
    a pump carried adjacent one end of said chassis;
    an electric motor and a battery therefor carried in a portion of said chassis opposite said pump;
    a vertical frame comprised of a plurality of spaced upright guide members carried by said chassis about said pump adjacent said end of the chassis and extending thereabove for receiving an upright removable and replaceable container of grease; and
    an upwardly projecting coupling means carried by said pump for communicating with a lower end of said container of grease receiving grease automatically upon reception of said container in said vertical frame supplying grease to said hose under pressure;
    whereby the spaced upright members of said vertical frame guide said removable and replaceable container of grease to position for immediately delivering grease to said pump through said coupling to serve as a temporary grease supply and to position same preparatory to removal for replacement by another removable and replaceable container of grease.

2. The structure set forth in claim 1 wherein said coupling means carried by said pump is receiving portion of a quick disconnect coupling, and including a delivery portion of said quick disconnect coupling carried by said lower portion of said container of grease for delivering grease to said pump.

3. The structure set forth in claim 1 wherein said coupling means carried by said pump includes an upright tube having an upturned cutting edge for fracturing said lower portion of said container of grease and penetrating same for receiving grease for delivery to said pump automatically upon reception of said container in said vertical frame.

4. A portable lubricating apparatus utilizing an upright removable and replaceable container of grease for delivery through a hose and nozzle comprising:
    a horizontal wheeled chassis;
    a pump carried by said chassis;
    an electric motor and a battery therefor carried in a portion of said chassis opposite said pump;
    a vertical frame comprised of four spaced upright guide members carried adjacent one end of said chassis extending thereabove for receiving an upright removable and replaceable container of grease; and
    an upwardly projecting coupling means connected to said pump for communicating with a lower end of said container of grease receiving grease automatically upon reception of said container in said vertical frame supplying grease to said hose under pressure;
    whereby the spaced upright guide members of said vertical frame guide said removable and replaceable container of grease to position for immediately delivering grease to said pump through said coupling to serve as a temporary grease supply and to position same preparatory to removal for replacement by another removable and replaceable container of grease.

* * * * *